May 22, 1956     E. C. GREANIAS     2,746,285
FLASH POINT MEASUREMENT APPARATUS
Filed March 9, 1951
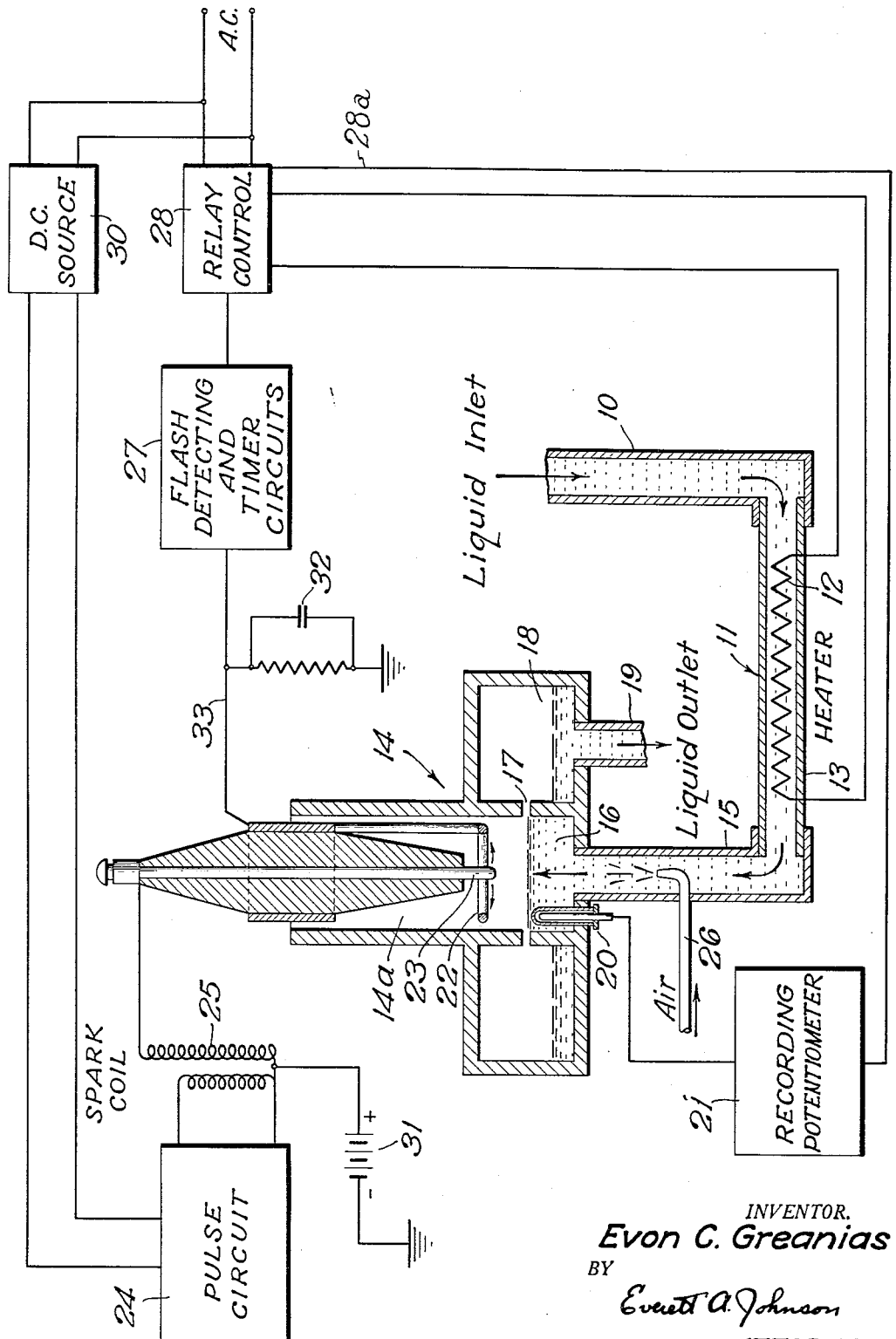
INVENTOR.
*Evon C. Greanias*
BY
*Everett A. Johnson*
ATTORNEY United States Patent Office 2,746,285
Patented May 22, 1956

2,746,285

FLASH POINT MEASUREMENT APPARATUS

Evon C. Greanias, Chicago, Ill., assignor to Standard Oil Company, Chicago, Ill., a corporation of Indiana Application March 9, 1951, Serial No. 214,801

13 Claims. (Cl. 73—36)

This invention relates to the determination of the flash point of liquids. The invention is more particularly directed to an apparatus for automatically determining and recording the flash point temperature of a continuous stream of liquid passing through.

The American standard methods for the determination of flash points include the Tag Closed Cup, Pensky-Martens Closed Cup and the Cleveland Open Cup. Each of these methods operates on a batch sample, the sample being heated at a prescribed rate and a test flame of precise size being inserted periodically into the vapor above the sample. The oil temperature at which the vapor from the batch sample explodes is designated as the "flash point." None of these methods is adaptable to a continuous and automatic system for determining the flash point of a flowing stream of liquid. Each of these methods requires the close supervision of an experienced operator; the test can only be made on a batch basis; and the operator must repeat the test until he is convinced that he has obtained a true indication of the flash point.

It is therefore an object of this invention to provide an apparatus which is particularly adapted for use in testing a flowing stream of sample for flash point. Another object of the invention is to provide a novel flash point indicating system which has an accuracy that is comparable to the best of the American standard methods. Still another object is to provide such a system which is fully automatic and does not require any special skill of the operator. A more specific object of the invention is to provide a reliable flash point instrument which can be operated with a minimum of attention.

Another object is to provide an apparatus which makes it possible to obtain a repeated indication of flash point on a flowing stream of liquid. An additional object of the invention is to provide a system for monitoring a pipe line carrying mixtures or successive batches of hydrocarbon liquids having different flash points. These and other objects of the invention will become apparent as the description thereof proceeds.

The general principle of my device is to measure and record the temperature of a stream of liquid which is maintained at the lowest temperature for which a flash will occur when a spark is periodically fired in the vapor space above the liquid. During the operation the liquid stream flows into a cup in which a constant liquid level is maintained. An electric heater in the liquid stream entering the cup raises the incoming liquid temperature. An electric spark fires periodically across a spark gap above the liquid in the cup and when the temperature of the incoming liquid has been increased sufficiently to cause substantial vaporization, the vapors are ignited by the spark to produce a flash. This flash controls a relay which turns the liqiud heater off for a fixed period of time which is longer than the sparking interval. The ignition means continues to spark and if the liquid temperature remains above its flash point when the next spark is fired another flash occurs and the heater remains off. Ultimately the liquid temperature lowers sufficiently so that the flashes cease, restoring the relay, and the heater goes on again. In this manner the liquid temperature is regulated to remain at the flash point of the liquid.

The liquid temperature may be measured continuously by means of a thermocouple or temperature-sensitive resistor in thermal contact with the liquid in the cup and recorded on a recording potentiometer. However, if desired, the flash-operated relay can control the time of the temperature recording so that a record is made only when a flash occurs.

My invention is particularly adapted as a monitor for flowing streams of hydrocarbon liquids in a pipe line. Thus in the transport of successive batches of hydrocarbons through pipe lines, it is desired to segregate fuel oil from kerosene, kerosene from gasoline, L. P. G. from crude, etc. This can be accomplished by running a continuous automatic flash point test on an increment of the material flowing in the pipe line and automatically indicating the temperature level at which the flashing occurs.

Further details of the invention are illustrated by the accompanying drawing which is an elevation schematically illustrating the general assembly of one embodiment of the apparatus.

Referring to the drawing, a liquid sample is supplied by inlet line 10 and passed through a preheater 11. The liquid preheater may comprise a Nicrome coil 12 cemented into a procelain tube 13. In passing through the tube 13 the liquid is heated by direct contact with the coil 12.

The preheated liquid enters the flash chamber 14 via conduit 15, the liquid flowing upwardly into the base of the cup 16. A constant liquid level is maintained in the cup 16 by having the liquid enter at the bottom and exit over a weir such as provided by a horizontal slit 17 which extends about the peripheral wall of the cup 16. The excess liquid is collected in an annular trough 18 about the cup 16 and drains therefrom through a liquid outlet 19. At flow rates of liquid up to about 30 cc. per minute, this arrangement of flash chamber and cup provides a pool of liquid of only very small variation in level.

The liquid passes successively through the heater 11, the conduit 15, the cup 16, and the outlet 19, and I have found that a preferred arrangement for obtaining the temperature is to place a thermocouple 20 in thermal contact with the liquid within the cup 16. In any event the heater 11 and flash chamber 14 are of light construction so as to keep the heat capacity thereof at a minimum and thus make rapid changes in the liquid temperatures possible.

The spark ignition means may be provided by a spark gap between opposed electrodes. In the drawing, the electrode surfaces comprise a ring 22 and a point 23, the point 23 being at the center of the ring 22. A conventional pulse circuit 24 controls a spark coil 25 which applies a periodic potential to the center electrode 23. Air enters the flash chamber 14 by diffusion through annular channel 14a. It is contemplated, however, that means for positive injection of air into the flash chamber can be provided; for example it may be introduced via jet 26 through the conduit 15 and bubbled upwardly through the cup 16 at a slow rate.

When the liquid temperature in the cup 16 is high enough to provide vapors that are flashed by the periodic spark, the resultant flash operates a flash detector 27 which actuates the relay 28 for a definite interval which in turn controls the heater 11. One arrangement for detecting the flash is to trigger the detection circuit in response to the ionization produced within the flash chamber 14 upon the occurrence of a flash. It is contemplated, however, that other flash-responsive means may be used to actuate the relay 28 or its equivalent. I may, for example, detect the occurrence of the flash by means of a sensitive resistance thermometer, a pressure-responsive element such as a bellows or an explosion-tripped switch responsive to the pressure wave generated by the flash. It is also possible to detect the occurrence of the flash by light-sensitive means the signal from which would in turn be amplified to control the relay.

The input stage of the flash detecting circuit 27 is a conventional amplifier which is sensitive to positive current only. When a flash occurs the ions formed by combustion conduct electrically across the spark gap electrodes 22 and 23 under the influence of the D. C. voltage (approximately 400 volts) supplied by voltage supply 31. The polarity of this current is such to give a positive signal at the flash detecting circuit 27. The spark coil 25 is connected to voltage supply 30 to give essentially negative voltage pulses. Therefore the current due to sparks does not operate the flash detecting circuit 27. The spark coil pulses generally have a strong alternating current component. The effect of this A. C. component on the flash detecting circuit is minimized by the resistance-capacity combination 32.

The timer circuit is any circuit which is actuated or controlled by the signal from the detector and produces a signal of such intensity and duration as to control the relay switch 28. This relay 28 regulates the input of heating current to the heater 11 and when "off" interrupts the heating current for a time greater than the time between sparks. Inasmuch as the details of the detection and timing circuits 27 and the relay 28 are not a primary part of the claimed invention, they will not be described in greater detail.

A single pair of electrodes 22 and 23 having potentials of opposite polarity impressed thereacross has been described. However, separate pairs of electrodes can be used for the sparking circuit and for the detection circuit.

The configuration of electrodes 22 and 23 shown in the drawing results in a large area over which ionization can be detected and also keeps the inter-electrode capacity small. If this capacity is too large stray electrical signals can trigger the detection circuit in the absence of a flash. The 50 micro-microfarad condenser 32 placed across the input 33 to the detection circuit 27 insures further that this type of triggering does not occur.

I have found that the indicated flash point depends upon the height of the electrodes 22 and 23 above the liquid surface in the cup 16. For this reason it is necessary to calibrate the instrument at a fixed electrode height with samples of known flash points.

The results obtained with this apparatus indicate that with a liquid flowing through the apparatus at a rate of about 20 cc. per minute, the maximum deviation observed in flash point temperature over a ten-minute period was about one degree. This compares favorably with the present standard methods which require reproducibility of results from 2° F. to 10° F. and place the burden of obtaining such consistency on the operator. By my system, however, such precision and reproducibility is automatically obtained. When the flash occurs above the liquid between electrodes 22 and 23 which has a D. C. voltage across them, the liquid heater 11 is automatically turned off for a controlled period of time which is at least greater than the period between sparks. The heater 11 remains off so long as the temperature of the liquid in the cup 16 is high enough to cause a flash. When the liquid temperature is lowered below the flash point, the heating is automatically resumed and in this manner the liquid temperature is regulated to oscillate in a very narrow temperature range at about the flash point of the liquid. This temperature is indicated and recorded by recording potentiometer 21.

However, if desired, the flash-operated relay 28 can control the recording potentiometer 21 so that a temperature record is automatically made only when a flash occurs in the chamber 14.

It should be understood that the continuous flash point testing system described is ordinarily applied to only an increment of a liquid withdrawn as a sample from the much larger stream. The flash indications obtained on this sample stream can then be recorded with time or rate of flow. Likewise, the indications can be used to control the properties of the flowing stream. Thus since this device measures the flash point of a continuous stream, it can be used to give a continuous record of the flash points of the products of a still, or to control the blending of components to produce a combined stream having the desired flash point characteristics.

It will be appreciated that where various flow operations are being controlled by the measurement of flash points, it is very necessary that the information regarding the flash point properties be known immediately. My system is particularly adapted for obtaining such indications.

Although my invention has been described in terms of specific apparatus which has been set forth in some detail, it should be understood that this is by way of illustration only and that the invention is not necessarily limited thereto. Alternative embodiments and operating techniques will become apparent to those skilled in the art in view of my disclosure. Accordingly, modifications in the invention are contemplated without departing from the spirit of the description or the scope of the appended claims.

I claim:

1. In a flash testing apparatus, a flash chamber, a cup within said chamber, conduit means exterior of said chamber supplying test liquid to said cup, a heater means for said conduit means, an overflow drain from said cup, a wall means defining a vapor space above said cup, a spark ignition means within said vapor space, means responsive to the temperature within the said cup, and electrical detector means responsive to an ignition flash in said chamber.

2. In a flash-responsive apparatus, a flash chamber, a cup within said chamber, conduit means exterior of said chamber to supply test liquid to said cup, a heater means for said conduit means, an overflow drain from said cup, a wall means defining a vapor space within said chamber above said cup, means for admitting air to said space, a spark ignition means within said vapor space, means responsive to the temperature in said cup, and flash-responsive detector means associated with said chamber.

3. An apparatus for continuously indicating the flash point of a liquid which comprises a flash chamber, a sample cup within said chamber, a conduit supplying test liquid to said cup, an overflow drain from said cup, a wall means defining a vapor space above said cup, an electrical spark ignition means within said vapor space, means exterior of said chamber for heating liquid supplied to said cup, means responsive to the temperature of the liquid within the flash chamber, and detector means automatically responsive to a flash occurring in said chamber.

4. Apparatus for automatically and continuously testing for the flash point of a flowing liquid which comprises a flash chamber, a heater remote from said cup for progressively increasing the temperature of the liquid to be supplied to the cup, means for passing the heated liquid through said flash chamber, means for admitting an oxygen-containing gas to the flash chamber concurrently with said heated liquid, ignition means for continuously applying an intermittent ignition spark to the vapor and gas mixture in said chamber, flash-responsive means for automatically detecting the occurrence of a flash in said chamber, a heater control regulated by such flash-responsive means to maintain the temperature of the liquid at the level at which flashing occurs, and means for recording the temperature of the liquid within the flash chamber.

5. Apparatus for automatically indicating the flash point of a hydrocarbon liquid which comprises in combination an unheated flash chamber, means for preheating a stream of the liquid at a progressively higher temperature, means for maintaining a pool of the preheated liquid within the flash chamber, means for admitting an oxygen-containing gas into said flash chamber, means for continuously applying an intermittent ignition spark to the vapor space above the pool of liquid within said flash chamber, and means for measuring the temperature of the liquid in said chamber.

6. Apparatus for automatically and continuously testing for the presence of low flash point material in a flowing liquid which comprises in combination means for preheating liquid to the temperature of the allowable flash point, means for continuously passing the heated liquid to be tested through a flash chamber, means responsive to the temperature of the liquid passing through said flash chamber, means for accumulating a pool of liquid in said chamber, means for admitting an oxygen-containing gas into the flash chamber, means for continuously applying an ignition spark to the vapor space above the pool of liquid in said flash chamber, and means for automatically detecting the occurrence of a flash in said vapor space.

7. An apparatus for automatically determining the flash point of a liquid hydrocarbon sample which includes the combination of means for preheating a liquid sample, means for flowing the preheated liquid into an unheated flash chamber, means for accumulating a quantity of the liquid sample within a flash chamber, means for accumulating at least a portion of the vaporized sample within a vapor space in said chamber, means for introducing an oxygen-containing gas into the vapor space of the said flash chamber, means for applying continuously an intermittent ignition spark to the vapor space within the flash chamber, means for detecting the occurrence of a flash, and means for indicating the temperature of said sample in said chamber.

8. An apparatus for automatically and continuously ascertaining the flash point of a liquid hydrocarbon sample which comprises in combination an unheated flash chamber, means for passing a stream of liquid to be tested continuously through said flash chamber, means for increasing the temperature of the said stream before it is passed into said flash chamber, means for accumulating vapors of the hydrocarbon sample within the said flash chamber, means for continuously withdrawing unvaporized liquid from said flash chamber, means for admitting an oxygen-containing gas continuously into said chamber, means for applying continuously an intermittent ignition spark to the vapor and gas mixture within said chamber, and means for measuring the temperature of the liquid at the occurrence of a flash as an indication of the flash point of the said liquid.

9. An apparatus for automatically indicating the flash point of a hydrocarbon liquid which comprises in combination means for preheating a stream of the liquid to a temperature approximating its flash point, means for flowing the preheated liquid through an unheated flash chamber, means for accumulating a pool of said preheated liquid in said chamber, means for admitting an oxygen-containing gas to said flash chamber, means for applying intermittently an ignition spark to the vapor space above the pool of liquid within said flash chamber, means for automatically detecting the occurrence of a flash in said vapor space, means for reducing the heat input to said stream in response to the flash, and means for automatically measuring the temperature of the liquid in the flash chamber at the flashing point.

10. An apparatus for continuously indicating the flash point of a liquid hydrocarbon which comprises in combination means for preheating a flowing liquid sample, means for introducing the preheated sample into an unheated flash chamber separate from said preheated means, means for accumulating a continuously renewed quantity of the sample within the flash chamber, means for continuously withdrawing a portion of the liquid sample from the flash chamber, means for evaporating at least a portion of the sample into a vapor space in said chamber, means for admitting an oxygen-containing gas to the vapor space of the flash chamber, means for applying intermittently an ignition spark to the vapor space within the flash chamber, means for automatically detecting the occurrence of a flash within said vapor space, means for discontinuing the preheating of the sample for a uniform period following the occurrence of each such flash, and means for indicating the temperature of said sample on the occurrence of a flash.

11. An apparatus for automatically and continuously ascertaining the flash point of a liquid hydrocarbon which comprises in combination a flash chamber means, means for passing a stream of the liquid to be tested continuously into said flash chamber, means for heating said stream before it is introduced into said flash chamber means, means for accumulating a continuously renewed sample in the lower part of said chamber, means for accumulating at least a portion of the hydrocarbon liquid as a vapor within an upper part of said chamber, means for continuously withdrawing liquid from said chamber, means for admitting an oxygen-containing gas into an upper part of said chamber, means for applying an intermittent ignition spark to the vapor and gas mixture within said chamber, electrical means for detecting the occurrence of a flash within said chamber, and means for measuring the temperature of the sample as an indication of the flash point of the sample.

12. An apparatus responsive to the flash point of a hydrocarbon liquid which comprises in combination a flash chamber, means exterior of said chamber for heating a stream of such liquid, means for flowing said heated liquid to said flash chamber, means for maintaining a pool of said heated liquid at a constant level within said chamber, means for admitting an oxygen-containing gas into said flash chamber, means for intermittently applying an ignition spark to the flash chamber above the level of such pool and in the presence of said gas, means for indicating the temperature of the liquid pool in the flash chamber, and means for automatically detecting the occurrence of a flash within said chamber.

13. The apparatus of claim 12 in which the temperature indicating means includes means for recording the temperature of the liquid upon the occurrence of a flash within the flash chamber.

References Cited in the file of this patent

UNITED STATES PATENTS

| | | |
|---|---|---|
| 1,232,413 | Von Bichowsky | July 3, 1917 |
| 1,583,600 | McBurney | May 4, 1926 |
| 2,500,964 | Sullivan et al. | Mar. 21, 1950 |
| 2,627,745 | Matteson | Feb. 10, 1953 |

FOREIGN PATENTS

| | | |
|---|---|---|
| 115,140 | Switzerland | June 1, 1926 |
| 583,505 | Germany | Sept. 5, 1933 |